United States Patent Office 3,509,206
Patented Apr. 28, 1970

3,509,206
ALKANESULFONIC ACID PREPARATION
Donald R. Nielsen, Corpus Christi, Tex., assignor to PPG Industries, Inc., a corporation of Pennsylvania
No Drawing. Filed Mar. 1, 1967, Ser. No. 619,576
Int. Cl. C07c 73/10
U.S. Cl. 260—502    6 Claims

ABSTRACT OF THE DISCLOSURE

Alkanesulfonic acids such as methanesulfonic acid are produced from hydrogen peroxide and the corresponding alkyl mercaptan or dialkyl disulfide. Such alkanesulfonic acid preparation is especially applicable in connection with the preparation of organic peracids by a procedure which forms the peracid using stoichiometric excesses of hydrogen peroxide in a reaction medium of alkanesulfonic acid.

Background of the invention

According to an article authored by Silbert, Siegel and Swern, Journal of Organic Chemistry, vol. 27, pp. 1336–1342, aromatic and aliphatic organic peracids may be prepared from hydrogen peroxide and the organic acid in a reaction medium containing as an essential component an alkanesulfonic acid such as methanesulfonic acid. In such a method, a slurry of the peracid product in alkanesulfonic acid results which also contains water (for example, generated by the reaction and decomposition of the hydrogen peroxide) as well as unconsumed hydrogen peroxide (usually present because of its use in stoichiometric excess). United States Letters Patent 3,143,562 notes this procedure is especially pertinent to the production of aromatic organic peracids. According to this patent, it is preferable to use excess hydrogen peroxide (over the stoichiometric needs of the reaction).

Efficient utilization of the alkanesulfonic acid component is quite important to the economics of preparing organic peracids in a reaction medium of the alkanesulfonic acid. It is thus important to recover the methanesulfonic acid from the reaction medium in a quality suitable for further use or recycle. This entails purifying the alkanesulfonic acid sufficiently to reduce or remove contaminants, especially water. Water, as the Silbert et al. article and patent make clear, has a detrimental effect since high organic peracid yields are favored by more concentrated aqueous hydrogen peroxide. Losses of methanesulfonic acid apt to be encountered in the process, especially in any cyclic process, should be overcome.

This invention deals with the preparation of alkanesulfonic acids from alkyl mercaptans or dialkyl disulfides and hydrogen peroxide. More particularly, it concerns the production of organic peracids by a process which relies upon a reaction medium of alkanesulfonic acid in which to effect the peroxidation. It interrelates such production of organic peracids with the preparation of alkanesulfonic acids (notably for the purpose of replenishing losses thereof) and utilizes the excess hydrogen peroxide available at the conclusion of the formation of peracid as the agent for converting the alkyl mercaptan or disulfide to the alkanesulfonic acid.

Summary of the invention

In accordance with the present invention, alkanesulfonic acids, typically the lower alkanesulfonic acids exemplified by methanesulfonic acid, are prepared from the appropirate precursor alkyl mercaptan or dialkyl disulfide by oxidation with hydrogen peroxide. Preparation of methanesulfonic acid or like lower alkanesulfonic acid is accomplished pursuant to an especially useful modification which involves utilizing the reaction mixture resulting from the preparation of organic peracids. Thus, methanesulfonic acid is prepared from methyl mercaptan or dimethyl disulfide according to a particular embodiment of the present invention by reaction thereof in a reaction medium of methanesulfonic acid and aqueous hydrogen peroxide of the type, for example, which is available at the conclusion of peroxidizing with hydrogen peroxide of organic acids to their respective peracid in a methanesulfonic acid. Due to this ability to utilize the hydrogen peroxide remaining in the methanesulfonic acid medium remaining after separating the organic peracid therefrom, this means for producing methanesulfonic acid is readily interrelatedly conducted in conjunction with the production of organic peracids, especially perphthalic acids such as dipersiophthalic acid. Diperisophthalic acid is useful, for example, as a solid bleaching agent for textiles.

As described in the aforecited Silbert et al. article, reaction of hydrogen peroxide and organic acids in methanesulfonic acid or like alkanesulfonic acid is best performed using high concentrations of hydrogen peroxide in amounts exceeding stoichiometric. As a result, the organic peracid product containing medium necessarily contains available hydrogen peroxide. After removal of the peracid, alkyl mercaptans, notably methyl mercaptan, or dialkyl disulfides as exemplified by dimethyl disulfide, are reacted in such medium to generate methanesulfonic acid while consuming hydrogen peroxide.

In a typical practice of this invention, aliphatic or aromatic peracids are prepared by the reaction of organic acid with hydrogen peroxide in alkanesulfonic acid whereafter the organic peracid is removed (usually by filtration or the like since most of the peracids are insoluble in the alkanesulfonic acid medium). This separated peracid is then washed preferably with water to remove entrained hydrogen peroxide and alkanesulfonic acid. To the resulting reaction medium (filtrate and/or water washings) methanesulfonic acid precursor is added and reaction between the residual hydrogen peroxide and mercaptan or disulfide is effected to yield methanesulfonic acid or like alkanesulfonic acids. Methanesulfonic acid in the resulting reaction medium is separated and purified, for example, by distillation to provide a substantially water-free alkanesulfonic acid composition. Provision of methanesulfonic acid compositions low in water or in substantially anhydrous state is prompted by the advantage in minimizing the amount of water tolerable in the peroxidizing step. In the conversion of organic acid to peracid, yields are higher the higher the hydrogen peroxide concentration. Thus, aqueous hydrogen peroxide containing at least 70 percent by weight hydrogen peroxide and preferably 90 to 95 weight percent hydrogen peroxide are recommended. Aqueous hydrogen peroxide containing much below 50 weight percent hydrogen peroxide (basis $H_2O_2$-$H_2O$ content) although useful are not apt to give appropriately high enough yields.

Besides methanesulfonic acid, the present invention is applicable to other alkanesulfonic acids, notably the lower alkanesulfonic acids having 1 to 4 carbon alkane groups such as ethane, propane, and the various butanes, the sulfonic acids of which are reported in the literature. The alkyl mercaptan which corresponds to the alkanesulfonic acid desired is, of course, used. Similarly, in lieu of or in addition to the mercaptan, the dialkyl disulfide precursor for the alkanesulfonic acid which is used is the one which has the corresponding alkyl group to the alkanesulfonic acid desired. In all likelihood, an intermediate product in the conversion of methyl mercaptan to methanesulfonic acid is dimethyl disulfide. It is primarily a matter of convenience and economics whether methyl mercaptan or dimethyl disulfide is employed insofar as the operability of the process is concerned. Because it is a liquid, dimethyl disulfide may be more readily handled than gaseous methyl mercaptan.

Conditions for converting the methyl mercaptan or dimethyl disulfide to methanesulfonic acid are widely variable. Temperatures ranging from 0° C. to 100° C., but more notably in the range of 10° C. to 40° C., are those most encountered. Atmospheric, superatmospheric and subatmospheric pressures are useful which are consistent with maintenance of an appropriate liquid phase in which to conduct the oxidation conversion of methanesulfonic acid of the appropriate precursor.

Proportions of hydrogen peroxide and methanesulfonic acid precursor are used, taking into account the desirability of obtaining complete conversion of whichever reactant is necessary, particularly in connection with a cyclic type process for producing percarboxylic acids. Here again, considerable latitude is involved and the method is not tied to any specific proportions.

As the example illustrates, formation of the alkanesulfonic acid is accomplished with aqueous hydrogen peroxide solutions much more dilute than those used in peracid formation. Thus, aqueous hydrogen peroxide solutions of hydrogen peroxide concentrations up to about 50 weight percent (rarely less than about 1 percent) serve quite well. Higher concentrations are operative. More dilute solutions are also capable of working.

In general, formation of methanesulfonic acid is performed in a liquid reaction medium containing as a principal component methanesulfonic acid itself. Typical reaction media in which the hydrogen peroxide and methanesulfonic acid precursor are brought into reactive content to form methanesulfonic acid contain initial methanesulfonic acid concentrations ranging from 50 weight percent upward, usually as high as 90 percent. Other components including organic acid and organic peracid as well as water can be present. Small amounts of sulfuric acid may also be present.

Description of the preferred embodiment

The following example illustrates the manner in which the present invention may be practiced:

Example I

A twelve-liter, three-necked glass flask fitted with a mechanical stirrer, a thermometer, a gas inlet tube and a Dry Ice condenser was charged with 8043 grams of a solution of the following composition:

| Component: | Weight percent |
|---|---|
| Methanesulfonic acid | 68.74 |
| Water | 27.09 |
| Hydrogen peroxide | 3.74 |
| Diperisophthalic acid | 0.06 |
| Sulfuric acid | 0.36 |

This composition corresponds to that which may be obtained, for example, by reacting hydrogen peroxide and isophthalic acid to produce disperisophthalic acid in methanesulfonic acid using a 100 percent stoichiometric excess of 90 percent hydrogen peroxide from which the diperisophthalic acid product is filtered combined with the water washings of the filtered peracid.

Some 118.8 grams (2.47 moles) of methyl mercaptan was added to the solution while it was at ambient temperature (about 25° C.). Weight increase of the solution indicated only 89 grams of methyl mercaptan actually was dissolved in the medium.

After filtration to remove the small amount of isophthalic acid which formed, the medium had the following composition:

| Component: | Weight percent |
|---|---|
| Methanesulfonic acid | 69.93 |
| Water | 28.68 |
| Hydrogen peroxide | 0.98 |
| Diperisophthalic acid | 0.04 |
| Sulfuric acid | 0.37 |

Based upon the weight increase in the reactor contents, the yield of methanesulfonic acid was 89 percent.

The resulting reaction mixture was then distilled in a two-inch diameter, three-foot high packed column provided with a thermosiphon operated at 37–39 millimeters mercury pressure and several fractions were collected. Some of these fractions were used to demonstrate the suitability of the methanesulfonic acid thereby recovered as the reaction medium solvent for the production of diperisophthalic acid from isophthalic acid and hydrogen peroxide.

Table I lists the various fractions collected, their weight, and the methanesulfonic acid concentration thereof:

TABLE I

| Fraction | Fraction weight (grams) | Weight percent MSA | Weight percent $H_2O_2$ | Weight percent $H_2SO_4$ |
|---|---|---|---|---|
| Feed | 7,262 | 69.1 | 0.99 | 0.37 |
| 1 | 1,233 | 79.45 | 1.21 | <0.02 |
| 2 | 634 | 97.84 | | 0.41 |
| 3 | 628 | 98.13 | | 0.22 |
| 4 | 732 | 99.18 | | 0.18 |
| 5 | 667 | 99.18 | | 0.26 |
| 6 | 242 | 99.47 | | 0.04 |
| 7 | 807 | 100+ | | 0.16 |

The methanesulfonic acid content of these seven fractions amounted to about 4600 grams and represented a 95 percent recovery of the methanesulfonic acid in the feed composition. The remaining methanesulfonic acid present in the feed to the column was equally distributed in the residue and remainder in the column. It was recovered and accounted for during washing and cleaning of the column.

The methanesulfonic acid composition obtained in the sixth fraction was employed in the peroxidation of isophthalic acid. Yields of diperisophthalic acid were essentially the same as those achieved with virgin methanesulfonic acid of the same purity and concentration obtained from a commercial source. Using the methanesulfonic acid of fractions 4 and 5 gave diperisophthalic acid yields comparable to those achieved with methanesulfonic acid of the same level of purity derived from a fresh commercial source.

In lieu of methanesulfonic acid, other alkanesulfonic acids, notably the lower alkanesulfonic acids such as ethanesulfonic acid, propanesulfonic acid and butanesulfonic acid, may be utilized as a reaction medium solvent for conducting the reaction of hydrogen peroxide with carboxylic acid to produce percarboxylic acids. The reaction medium resulting from such production of peracids, after having had the peracid removed, usually by centrifugation, filtration or like solid removal (the peracids all tend to be substantially insoluble in the alkanesulfonic acid) may then be employed as the reaction medium in which to provide for more of the appropriate alkanesulfonic acid. Where ethanesulfonic acid is the reaction medium component and it is desirable to take advantage of the hydrogen peroxide present in combination therewith, ethyl mercaptan or diethyl disulfide may be used. Similarly, the corresponding propyl mercaptan or dipropyl disulfide or any one of the butyl mercaptans or dibutyl disulfides can be used to produce their corresponding alkanesulfonic acids. Obviously, mixtures can also be produced but this is less preferable, leading to complications of purification in the provision of alkanesulfonic acid reaction medium.

In the sequence of steps involved in the formation of percarboxylic acid, removal thereof and generation of further alkanesulfonic acid utilizing the residual hydrogen peroxide in the residual reaction medium, the reaction with the mercaptan or disulfide is conducted prior to dehydrating or otherwise subjecting the methanesulfonic acid to any extensive heating or elevated temperatures such as would be encountered in normal distillations. Heating such as involved in distillative purification will decompose hydrogen peroxide; if the heating is for any extended period period, it is apt to reduce the available hydrogen peroxide.

The present invention is applicable to methods which produce any of a wide number of aromatic and aliphatic percarboxylic acids. Among those that may be mentioned are the peracids of monocarboxylic and dicarboxylic acids, benzoic, para-methoxybenzoic, para-tertiary-butylbenzoic, para-nitrobenzoic, ortho-nitrobenzoic, para-cyanobenzoic, lauric, stearic, palmitic, sebacic, alpha-bromocapric, alpha-bromostearic, and the like. Mono- and diperacids of the various phthalic acids including terephthalic, isophthalic, and phthalic itself are prepared with particular efficacy.

While the invention has been described with respect to specific details of certain embodiments, it is to be understood that it is not to be construed as limited to such details except insofar as they appear in theh appended claims.

I claim:
1. A method of producing percarboxylic acids which comprises forming the peracid from concentrated aqueous hydrogen peroxide containing at least 70 percent by weight hydrogen peroxide and carboxylic acid in a liquid reaction medium of a lower alkanesulfonic acid whose alkane group is a 1 to 4 carbon alkane containing a stoichiometric excess of said concentrated hydrogen peroxide, separating so formed peracid from the resulting medium leaving a 1 to 4 carbon alkanesulfonic acid composition containing diluted residual hydrogen peroxide, combining an alkanesulfonic acid percursor with its alkyl group corresponding to that of the alkanesulfonic acid of said composition wherein said precursor is selected from the group consisting of alkyl mercaptans, dialkyl disulfides, and mixtures thereof with the composition containing said aqueous diluted residual hydrogen peroxide, converting said alkanesulfonic acid precursor to its corresponding alkanesulfonic acid using said residual hydrogen peroxide in the composition, substantially dehydrating the resulting composition to provide an alkanesulfonic acid low in water, and utilizing such dehydrated alkanesulfonic acid as a component of the liquid reaction medium in which peracids are formed from concentrated hydrogen peroxide and carboxylic acid.

2. The method of claim 1 wherein the alkanesulfonic acid is methanesulfonic acid and the alkanesulfonic acid precursor is either methyl mercaptan, dimethyl disulfide or a mixture thereof.

3. The method of claim 1 wherein the carboxylic acid is isophthalic acid and peracid is diperisophthalic acid.

4. The method of claim 1 wherein the aqueous diluted residual hydrogen peroxide in the alkanesulfonic acid composition contains up to 50 weight percent hydrogen peroxide.

5. The method of claim 1 wherein the conversion is effected at from 0° C. to 100° C.

6. The method of claim 1 wherein the alkanesulfonic acid concentration in said composition containing diluted residual hydrogen peroxide is from 50 to 90 weight percent.

References Cited
UNITED STATES PATENTS

| | | | |
|---|---|---|---|
| 2,667,507 | 1/1954 | Jones et al. | 260—513 |
| 3,079,411 | 2/1963 | Silbert et al. | 260—513 |
| 3,143,562 | 8/1964 | Silbert et al. | 260—513 |

FOREIGN PATENTS

| | | |
|---|---|---|
| 522,840 | 6/1940 | Great Britain. |
| 905,470 | 3/1954 | Great Britain. |

OTHER REFERENCES

Shoewell et al.; J. Org. Chem., vol. 27, p. 2853.
Gilbert: Sulfonation and Related Reactions, pp. 220–224, 1965.

BERNARD HELFIN, Primary Examiner
W. B. LONE, Assistant Examiner

PO-1050
(5/69)

UNITED STATES PATENT OFFICE
CERTIFICATE OF CORRECTION

Patent No. 3,509,206      Dated April 28, 1970

Inventor(s) Donald R. Nielsen

It is certified that error appears in the above-identified patent and that said Letters Patent are hereby corrected as shown below:

In Column 1, line 3, --Pittsburgh, Pa.-- is not listed after "Industries, Inc.,".

In Column 5, line 40 "percursor" should be --precursor--.

In the references, the British Patent listed as "905,470" should be --705,470--.

OCT 27 1970

(SEAL)
Attest:

Edward M. Fletcher, Jr.
Attesting Officer

WILLIAM E. SCHUYLER, JR.
Commissioner of Patents